United States Patent Office 3,577,352
Patented May 4, 1971

3,577,352
TEMPERATURE INDICATING DEVICE OF DISPERSION FILTER ADJUSTED TO PRODUCE COLOR CHANGES NEAR 0° C.
Jan Bol, Kelkheim, Taunus, Germany, assignor to Battelle-Institute e.V., Frankfurt am Main, Germany
No Drawing. Filed May 17, 1968, Ser. No. 730,201
Claims priority, application Great Britain, May 17, 1967, 58,798/67
Int. Cl. G01k 11/16, 11/18
U.S. Cl. 252—408                                         8 Claims

ABSTRACT OF THE DISCLOSURE

A temperature indicating device using a Christiansen filter wherein the refractive indices and dispersion values of the solid and the fluid phase are so adjusted as to produce color changes near the freezing point.

---

The invention relates to a temperature indicating device for visual indication of the temperature, particularly in the region of 0° C., on the basis of a dispersion filter (Christiansen filter).

Such devices are known which are based on the change in optical characteristics with the temperature and which indicate a temperature change either by a color change or by a change in their light transmittance.

It is a principal object of the invention to provide a device indicating a temperature change within a certain predetermined range by association of different colors of the spectrum.

Other objects and advantages will be apparent from a consideration of the specification and claims.

According to the invention, there is provided a temperature indicating device using a dispersion filter which has a solid phase in the form of a thick packing of crystals or grains of optical glass and a fluid phase, wherein the solid phase has a refractive index ($n_D$) of from approximately 1.496 to 1.508 and a dispersion ($n_F-n_C$) of from approximately 0.007 to 0.012, and the fluid phase a refractive index ($n_D$) of from approximately 1.480 to 1.498 and a dispersion ($n_F-n_C$) of from approximately 0.009 to 0.012 with a temperature coefficient ($dn/dT$) of from approximately $3.0\times10^{-4}$ to $5.0\times10^{-4}$ per ° C.

In one modified form of the invention, there is provided a temperature indicating device using a dispersion filter which has a solid phase in the form of a thick packing of crystals or grains of optical glass and a fluid phase, wherein the solid phase has a refractive index ($n_D$) of from approximately 1.508 to 1.514, and a dispersion ($n_F-n_C$) of from approximately 0.007 to 0.012, and the fluid phase has a refractive index ($n_D$) of from approximately 1.490 to 1.510, and a dispersion ($n_F-n_C$) of from approximately 0.009 to 0.015, with a temperature coefficient ($dn/dT$) of from approximately $3.0\times10^{-4}$ to $5.0\times10^{-4}$ per ° C.

In another modified form of the invention there is provided a temperature indicating device using a dispersion filter which has a solid phase in the form of a thick packing of crystals or grains of optical glass and a fluid phase, wherein the solid phase has a refractive index ($n_D$) of from approximately 1.484 to 1.496, and a dispersion ($n_F-n_C$) of from approximately 0.009 to 0.013, and the fluid phase has a refractive index ($n_D$) of from approximately 1.472 to 1.496, and a dispersion ($n_F-n_C$) of from approximately 0.009 to 0.012 with a temperature coefficient ($dn/dT$) of from approximately $3.0\times10^{-4}$ to $5.0\times10^{-4}$ per ° C.

The preferred temperature indicating device according to the invention has the advantage that it embraces the temperature range, narrow for dispersion filters, of from approximately $-5$ to $+5°$ C. i.e. with a temperature change around this range, the dispersion filter indicates in sequence the colors of the spectrum. As the human eye can distinguish numerous single colors in the visible spectral region, an accuracy of measurement of 1° C. is achieved with this temperature indicating device.

By changing the mixing proportions of the fluid components the indicatable temperature range can be shifted within wide limits.

The following tables show by way of example the combinations and the properties of Christiansen Filters suitable for use as temperature indicating devices:

FILTER I

Solid component: B K 10 Glass (trade name of Schott and Gen., Mainz)—
  Index of refraction at 20° C.: $n_D=1.498$
  Dispersion: $n_F-n_C=0.007$
    $n_D$=Index of refraction at the sodium-D-Line
    $n_F$=Index of refraction at the hydrogen-F-Line
    $n_C$=Index of refraction at the hydrogen-C-Line Fluids Phylanton (trade name of Dragoco, Holzminden)—
  Ketone, light-, air-, and temperature-proof
  Index of refraction at 20° C.: $n_D=1.484$
  Dispersion: $n_F-n_C=0.010$
  Temperature coefficient: $dn/dT=4.2\times10^{-4}$ per ° C.
Gamma-Turiol (registered trademark of Dragoco, Holzminden)
Unsaturated, primary alcohol, terpene hydrocarbon derivative
  Stable alcohol, light-, air-, and temperature-proof
  Index of refraction at 20° C.: $n_D=1.495$
  Dispersion: $n_F-n_C=0.011$
  Temperature coefficient: $dn/dF=3.8\times10^{-4}$ per ° C.

A mixture of two parts of Phylanton with one part of gamma-Turiol. Use of B K 10 glass with a grain size of approximately 0.1 mm., with layers of 2–3 mm. thick, provides a Christiansen filter with intensive, well distinguished colors. The colors may be arranged in the following temperature ranges:

| Temperature range, (° C.) | Temperature, (° C.) | Color | Intensity [1] |
|---|---|---|---|
| Above 7 | | White, tinted with blue | 0.3 |
| 7 to 5 | 2 | Violet | 0.5 |
| 4.5 to 3 | 1.5 | Blue | 0.7 |
| 2.5 to 0.5 | 2 | Bright green | 1.5 |
| 0.5 to −0.5 | 1 | Dark green | 2 |
| Below −0.5 | | Yellow | ca. 5 |

[1] The light transmitted undisturbed, in percent of the incident light measured with a selenium cell.

By suitable variation in the proportions of the two fluids in the mixture, this color temperature scale can be displaced by some ° C. to higher or lower temperatures, practically without alteration.

FILTER II

Solid component: K 11 Glass (trade name of Schott & Gen., Mainz)—
  Index of refraction at 20° C.: $n_D=1.500$
  Dispersion: $n_F-n_C=0.008$ Fluids Phylanton
Gamma-Turiol:
  Properties—see Filter I A mixture of one part of Phylanton with two parts of gamma-Turiol. The use of K 11 Glass with a grain size of approximately 0.1 mm., with layers of 2 to 3 mm. thick, result in a Christiansen Filter which surpasses Filter I, particularly with respect to brightness and purity of the colors and also with respect to the color variations with temperature being clearly discernable. In this case too the temperature scale can also be displaced by variation of the proportions of the mixture.

| Temperature range, ° C. | Temperature, ° C. | Color | Intensity [1] |
|---|---|---|---|
| Above 4 | | Violet | 2.5 |
| 4 to 3 | 1 | Blue | 4 |
| 3 to 2 | 1 | Blue-green | 5.5 |
| 2 to −0.5 | 2.5 | Yellow | ca. 15 |

[1] The light transmitted undisturbed in percent of the incident light measured with a selenium cell.

FILTER III

Solid components: Ti F 1 Glass (trade name of Schott & Gen., Mainz)—
- Index of refraction at 20° C.: $n_D = 1.511$
- Dispersion: $n_F - n_C = 0.010$ Fluids Vetikon (trade name of Dragoco, Holzminden—
- Stable ketone, light-, air-, and temperature-proof
- Index of refraction at 20° C: $n_D = 1.510$
- Dispersion: $n_F - n_C = 0.014$
- Temperature coefficient: $dn/dT = 4.4 \times 10^{-4}$ per ° C.

Gamma-Turiol:
- Properties—see Filter I

With a mixture of four parts of Vetikon with 8.5 parts of gamma-Turiol, with the Ti F 1 Glass having a mean grain size of 0.2 mm., and a filter layer of 2.5 mm. thick, there is provided a Christiansen Filter which shows extraordinarily bright colors with a high degree of intensity. The colors indicated in the following table appear at freezing point.

| Temperature range, ° C. | Temperature, ° C. | Color |
|---|---|---|
| Above 1.5 | | Violet. |
| 1.5 to 0.5 | 1 | Blue. |
| 0.5 to −1 | 1.5 | Green-blue. |
| Below −1 | | Green. |

With this filter, the temperature scale can be displaced in a wide range of temperatures by variation of the proportions of the fluids in the mixture.

FILTER IV

Solid component: Sylvin (potassium chloride)—
- Index of refraction at 20° C: $n_D = 1.490$
- Dispersion: $n_F - n_C = 0.011$
- Temperature coefficient: $dn/dT = 3.1 \times 10^{-5}$ per ° C.

Fluids

Gamma-Turylacetate (trade name of Dragoco, Holzminden)—
- Gamma-Turiol ester, stable, light-, air-, and heat-proof
- Index of refraction at 20° C.: $n_D = 1.476 - 1.477$
- Dispersion: $n_F - n_C = 0.011$
- Temperature coefficient: $dn/dT = 4.6 \times 10^{-4}$ per ° C.

Gamma-Turiol:
- Properties—see Filter I

A mixture of 11.5 parts of gamma-Turylacetate with 5.5 parts of gamma-Turiol. Grain size of potassium chloride of from 0.1 to 0.3 mm., with a filter layer of 2.5 mm. thick, provides a Christiansen Filter which shows no colors, but has a maximum degree of transparency for white light at 0° C. The half width of the transmission band is approximately 6° C.

FILTER V

Solid component: Sylvin (potassium chloride)—
- Properties—see Filter IV

Fluids

Phylanton, Properties: see Filter I
Gamma-Turylacetate:
- Properties—see Filter IV A mixture of 5 parts of Phylanton with 3 parts of gamma-Turylacetate, with a layer of 2.5 mm. thick and potassium chloride grain size of 0.2 mm., provides a Christiansen Filter which in reverse to Filters I to III, shows the spectral colors with decreasing temperature, in the sequence red, yellow, green, blue, violet. The relation of temperature to color with the above proportions is indicated in the following table:

| Temperature range, ° C. | Temperature, ° C. | Color |
|---|---|---|
| Plus 2.5 to 1 | 1.5 | Reddish. |
| Plus 1 to −1 | 2 | Orange. |
| Minus to −3 | 2 | Orange-yellow. |
| At −4 | | Green. |

The colors are closer and not as clearly differentiated as in the case of Filters I to III.

I claim:
1. A temperature indicating device using a dispersion filter which has a solid phase in the form of a thick packing of crystals or grains of optical glass and a fluid phase, wherein the solid phase has a refractive index ($n_D$) of from approximately 1.496 to 1.508 and a dispersion ($n_F - n_C$) of from approximately 0.007 to .012, and the fluid phase has a refractive index ($n_D$) of from approximately 1.480 to 1.498 and a dispersion ($n_F - n_C$) of from approximately 0.009 to 0.012 with a temperature coefficient ($dn/dT$) of from approximately $3.0 \times 10^{-4}$ to $5.0 \times 10^{-4}$ per ° C.

2. A tempertaure indicating device according to claim 1, wherein the fluid phase is formed by mixing two fluids.

3. A temperature indicating device according to claim 2, wherein one fluid has a refractive index ($n_D$) of approximately 1.484 and a dispersion ($n_F - n_C$) of approximately 0.01, the other fluid has a refractive index ($n_D$) of approximately 1.495 and a dispersion ($n_F - n_C$) of approximately 0.011, the refractive index ($n_D$) of the solid phase being approximately 1.498 and its dispersion ($n_F - n_C$) being approximately 0.007.

4. A temperature indicating device according to claim 3, wherein a solid phase has a refractive index ($n_D$) of approximately 1.5 and a dispersion ($n_F - n_C$) of approximately 0.008.

5. A temperature indicating device using a dispersion filter which has a solid phase in the form of a thick packing of crystals or grains of optical glass and a fluid phase, wherein the solid phase has a refractive index ($n_D$) of from approximately 1.508 to 1.514, and a dispersion ($n_F - n_C$) of from approximately 0.007 to 0.012, and the fluid phase has a refractive index ($n_D$) of from approximately 1.490 to 1.510, and a dispersion ($n_F - n_C$) of from approximately 0.009 to 0.015, with a temperature coefficient ($dn/dT$) of from approximately $3.0 \times 10^{-4}$ to $5.0 \times 10^{-4}$ per ° C.

6. A temperature indicating device according to claim 5, wherein the solid phase has a refractive index ($n_D$) of approximately 1.511 and a dispersion ($n_F - n_C$) of approximately 0.01 and the fluid phase is a mixture, one fluid having a refractive index ($n_D$) of approximately 1.51 and a dispersion ($n_F - n_C$) of approximately 0.014, and the other fluid having a refractive index ($n_D$) of approximately 1.495 and a dispersion ($n_F - n_C$) of approximately 0.011.

7. A temperature indicating device using a dispersion filter which has a solid phase in the form of a thick packing of crystals or grains of optical glass and a fluid phase, wherein the fluid phase has a refractive index ($n_D$) of from approximately 1.484 to 1.496 and a dispersion ($n_F - n_C$) of from approximately 0.009 to .013 and the fluid phase has a refractive index ($n_D$) of from approximately 1.472 to 1.496, and a dispersion ($n_F-n_C$) of from approximately 0.009 to 0.012 with a temperature coefficient ($dn/dT$) of from approximately $3.0 \times 10^{-4}$ to $5.0 \times 10^{-4}$ per ° C.

8. A temperature indicating device according to claim 7, wherein the solid phase has a refractive index ($n_D$) of approximately 1.49 and a dispersion ($n_F-n_C$) of approximately 0.011 and the fluid phase is a mixture, one fluid having a refractive index ($n_D$) of approximately 1.476 and a dispersion ($n_F-n_C$) of approximately 0.011 and the other fluid having a refractive index ($n_D$) of approximately 1.495 and a dispersion ($n_F-n_C$) of approximately 0.011.

References Cited
UNITED STATES PATENTS
2,666,582  1/1954  Whitney _____ 252—408

HAROLD ANSHER, Primary Examiner
M. E. McCAMISH, Assistant Examiner

U.S. Cl. X.R.
23—230; 73—356; 161—408, 410; 350—160